May 12, 1970

R. K. STRASEL 3,511,033

GANG LAWN MOWING MACHINE

Filed Oct 18, 1968

INVENTOR

RAYMOND K. STRASEL

BY: *Arthur J Hansmann*
ATTORNEY

May 12, 1970 R. K. STRASEL 3,511,033
GANG LAWN MOWING MACHINE
Filed Oct. 18, 1968 10 Sheets-Sheet 2
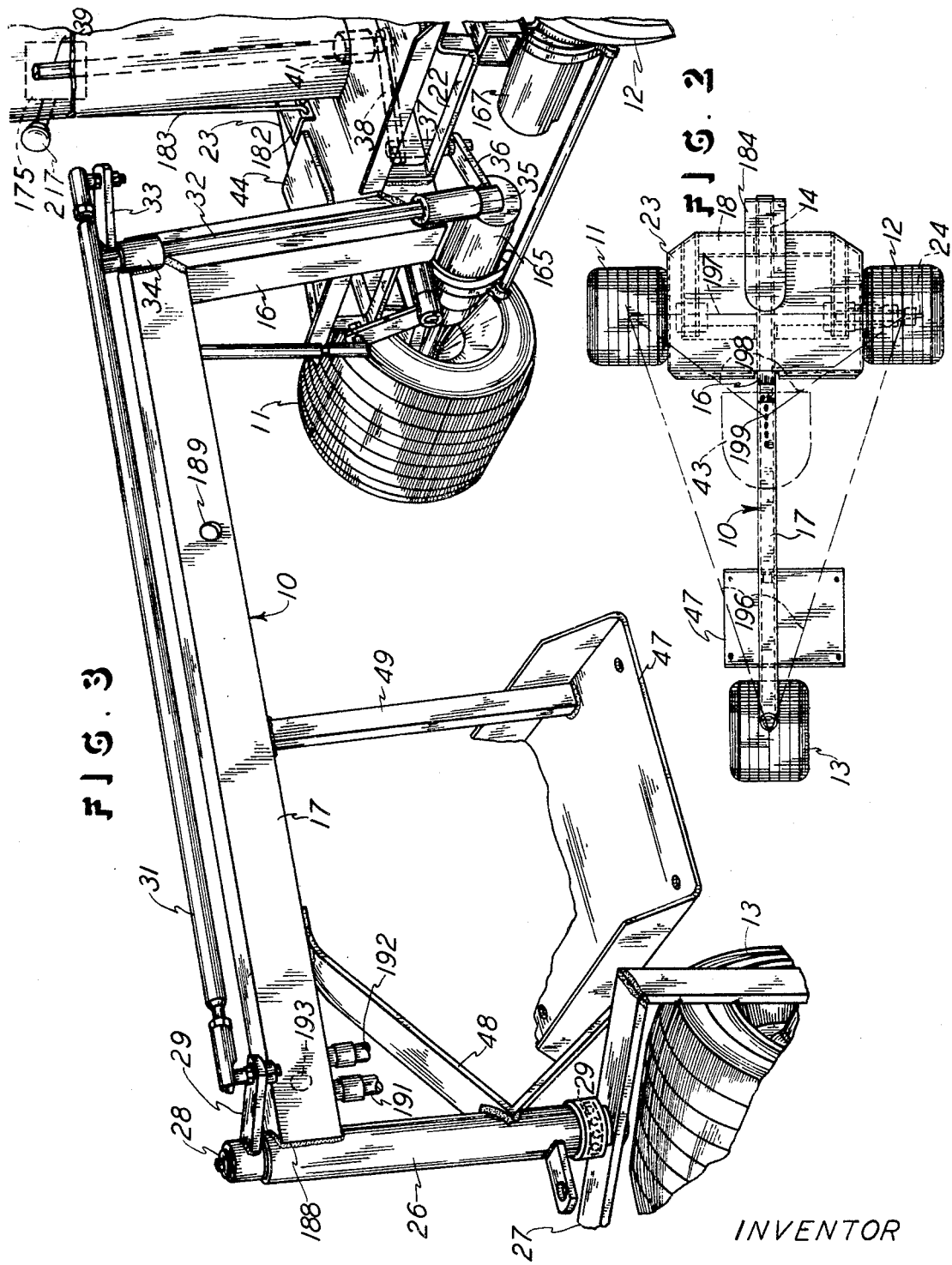
INVENTOR
RAYMOND K. STRASEL
BY: *Arthur J. Hansmann*
ATTORNEY

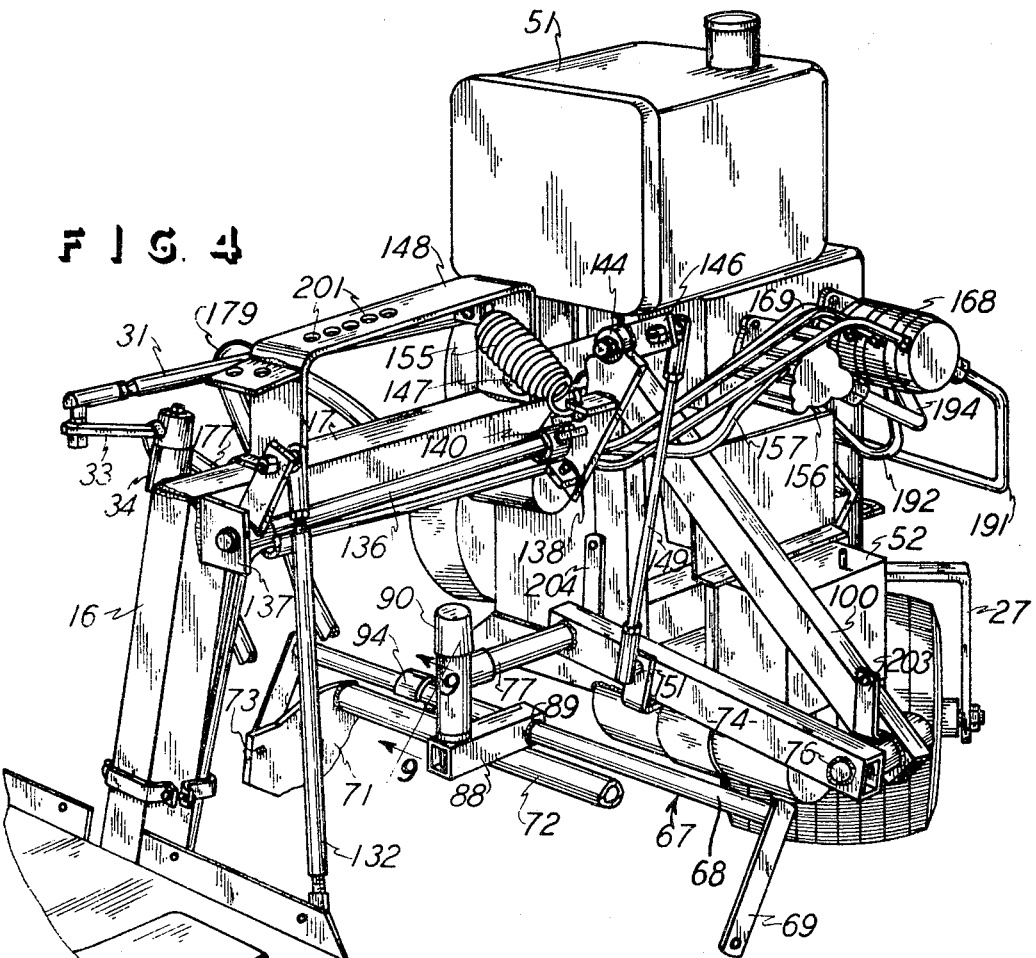

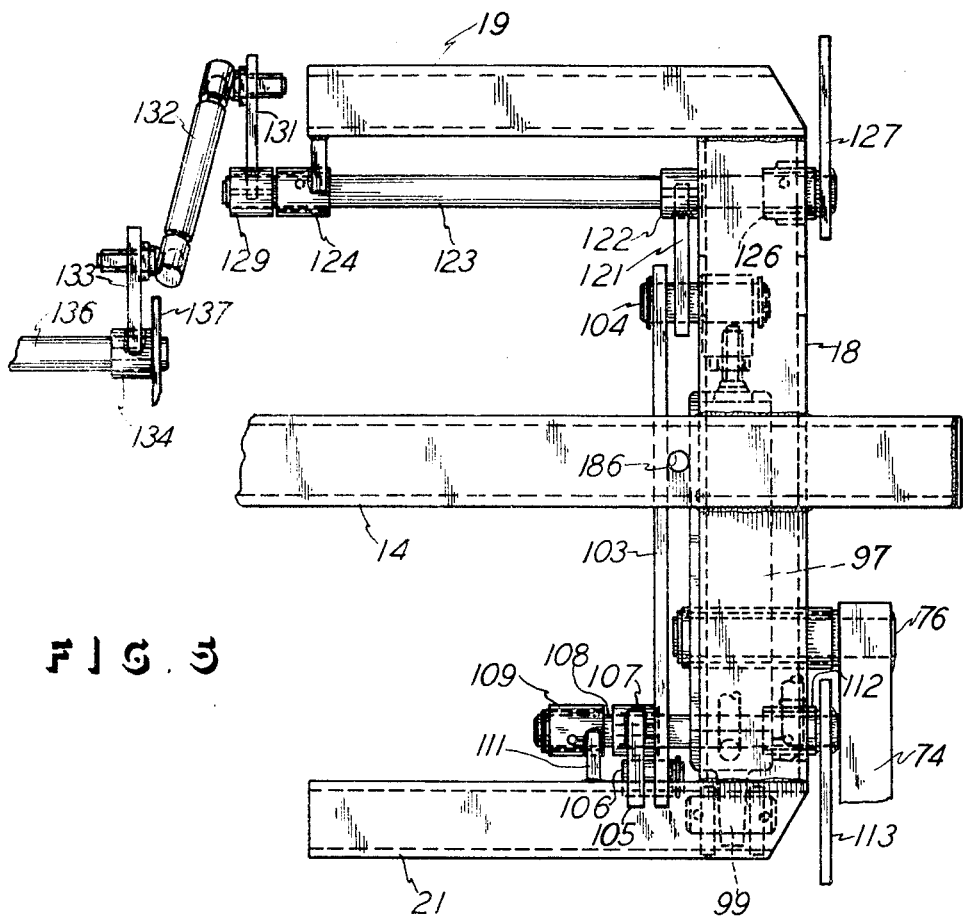

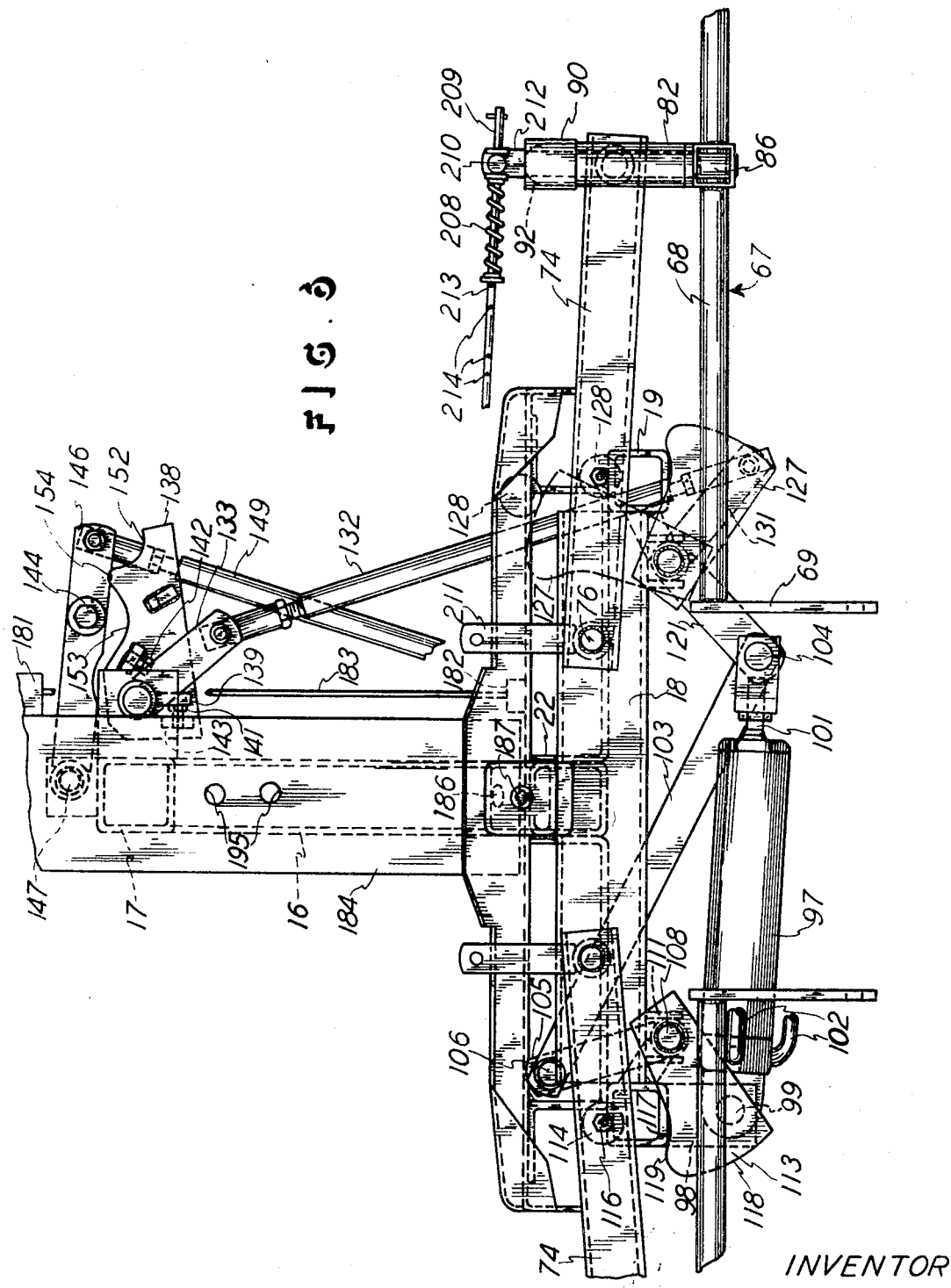

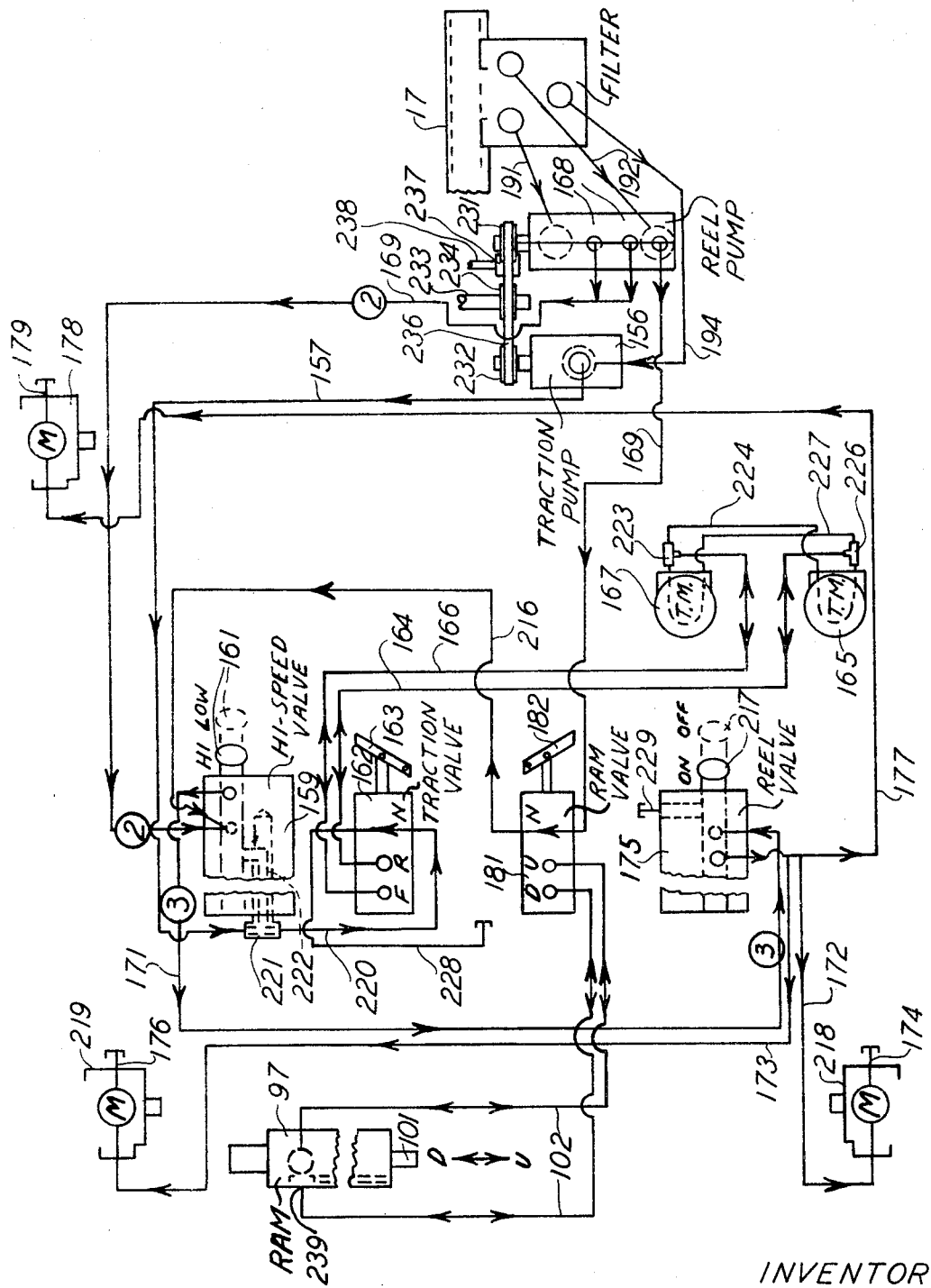

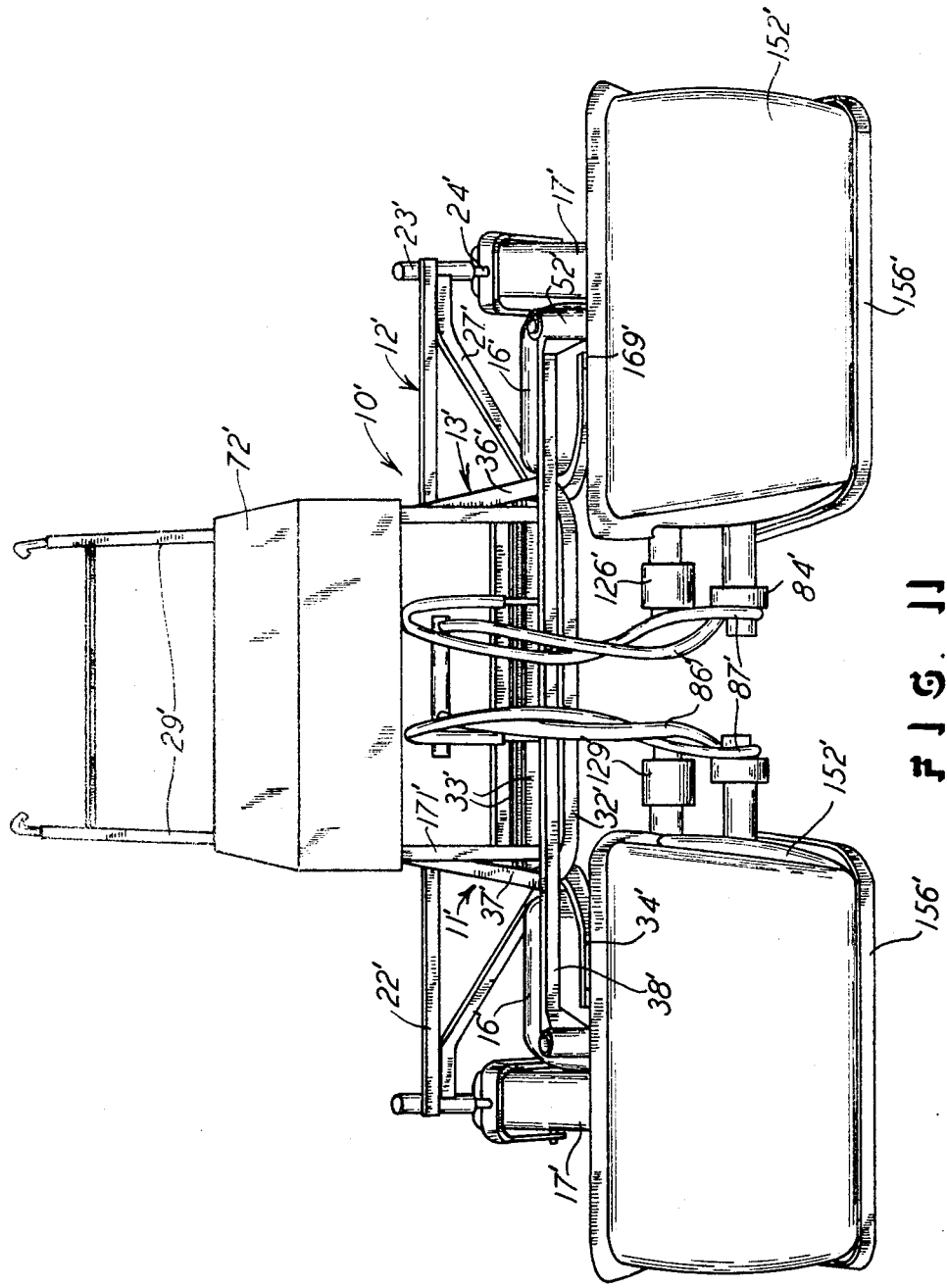

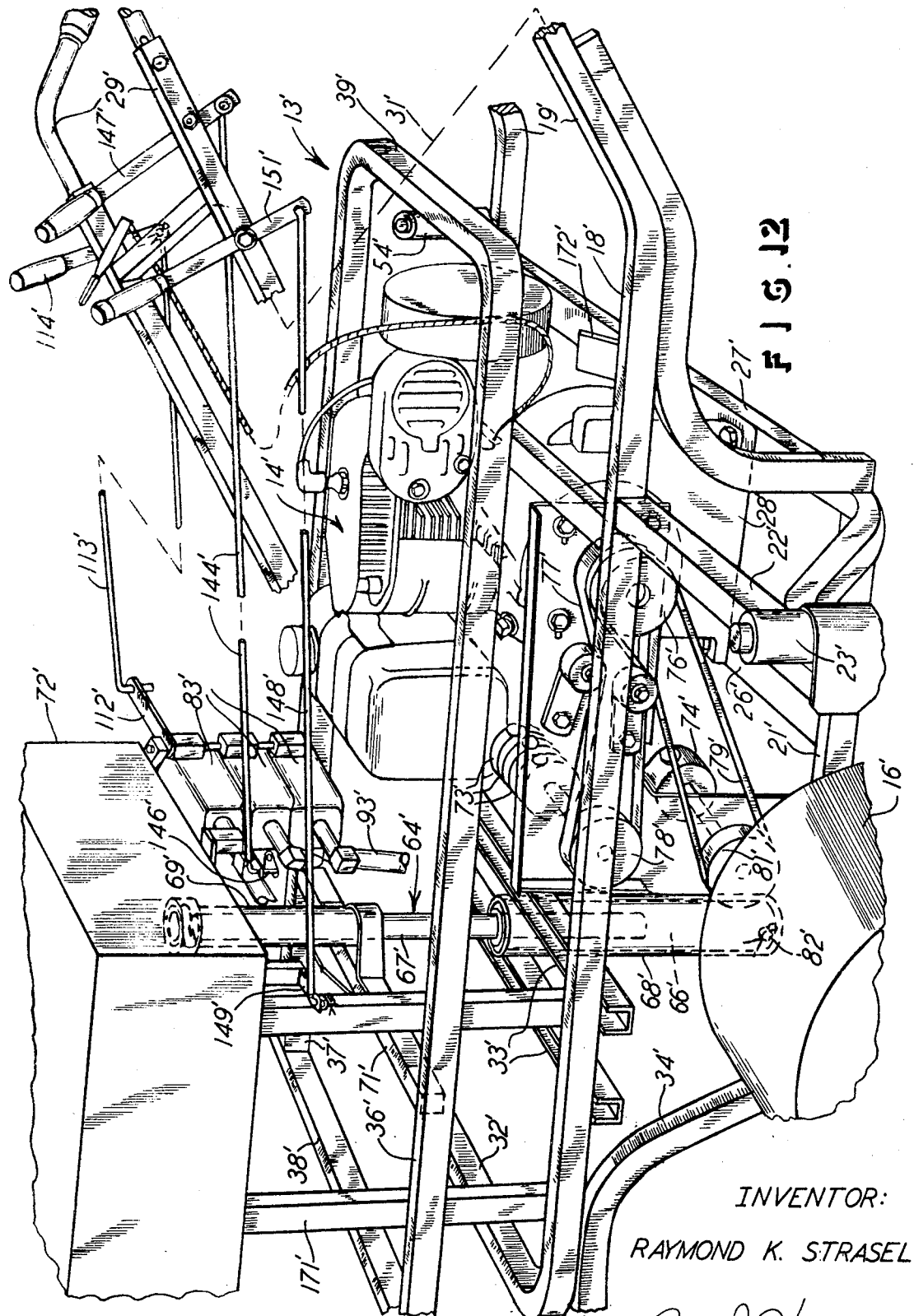

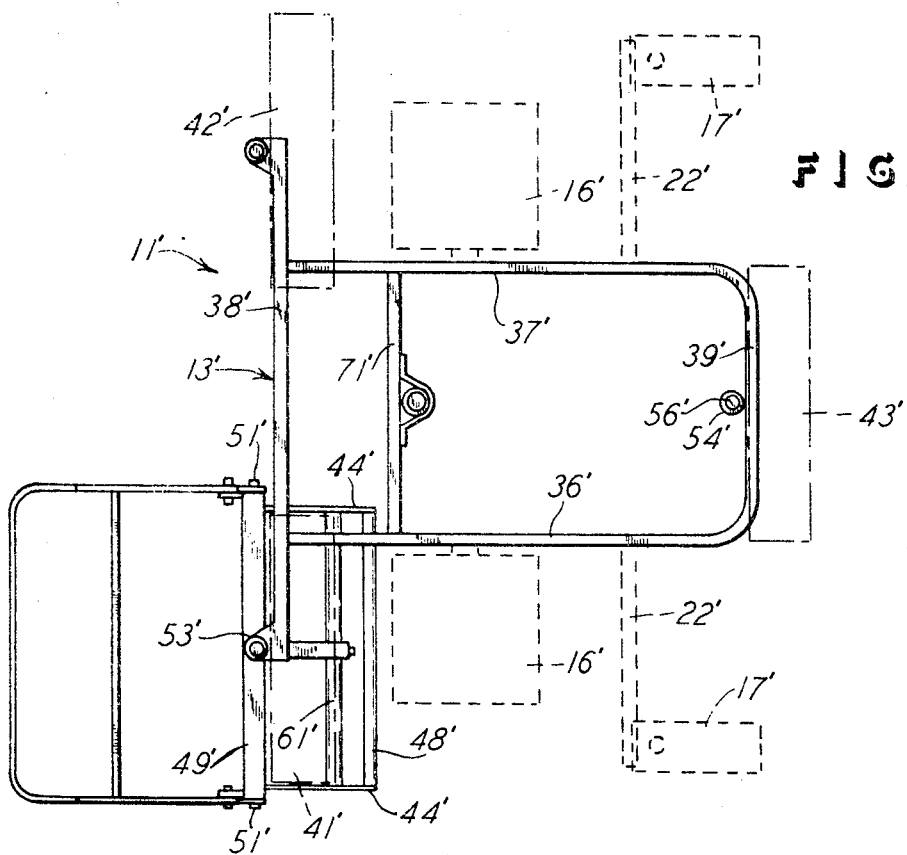
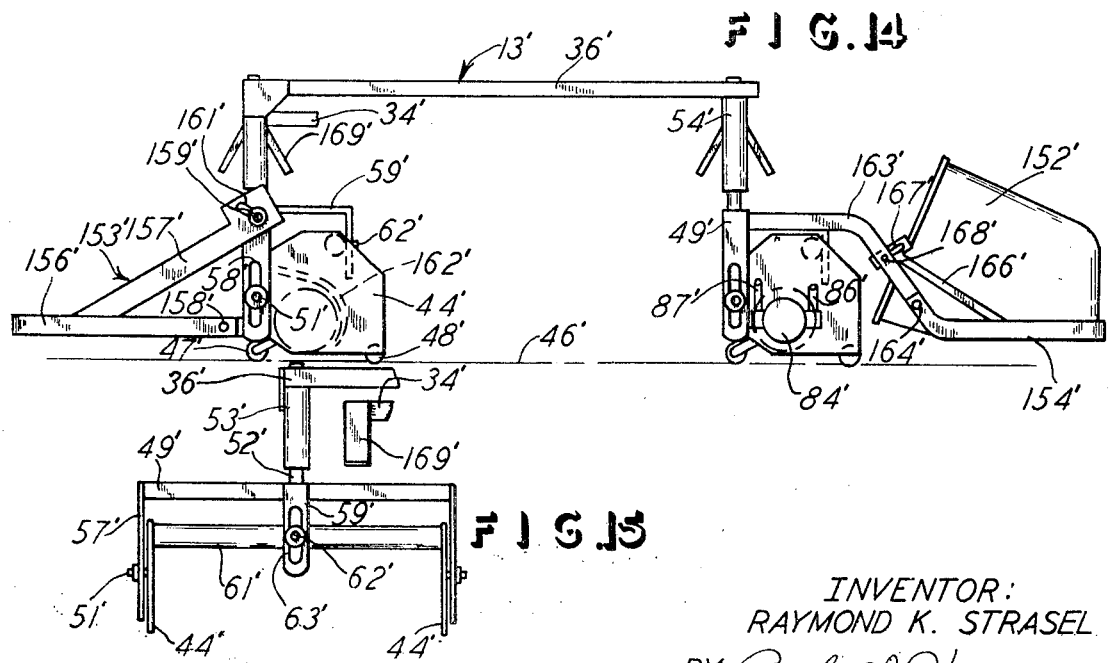

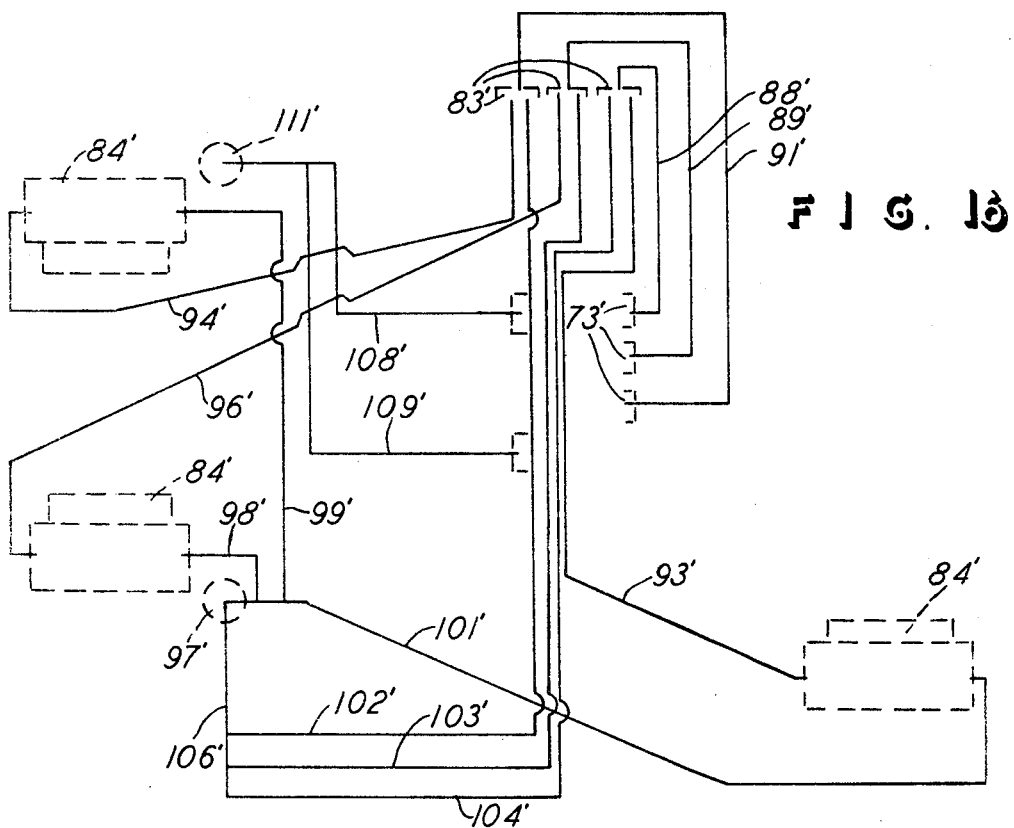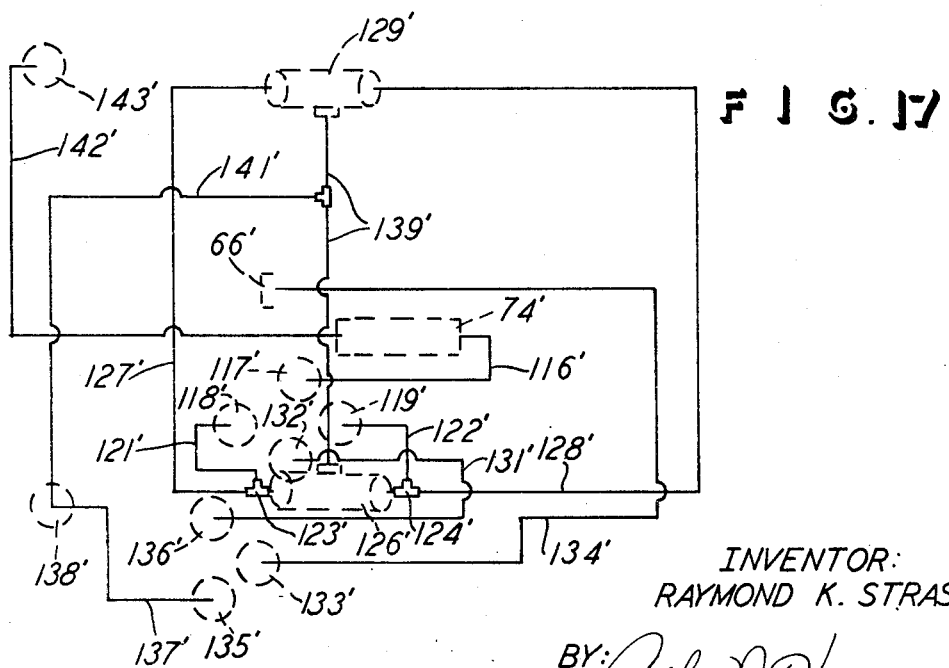

United States Patent Office 3,511,033
Patented May 12, 1970

3,511,033
GANG LAWN MOWING MACHINE
Raymond K. Strasel, Winthrop Harbor, Ill., assignor to Jacobsen Manufacturing Company, Racine, Wis., a corporation of Wisconsin
Continuation-in-part of application Ser. No. 478,049, Aug. 9, 1965. This application Oct. 18, 1968, Ser. No. 768,648
The portion of the term of the patent subsequent to Feb. 25, 1986, has been disclaimed
Int. Cl. A01d 75/30
U.S. Cl. 56—7                                       26 Claims

ABSTRACT OF THE DISCLOSURE

A gang lawn mowing machine having a tractor with a plurality of mowers articularly mounted on the tractor for raising and lowering the mowers and for moving the mowers through steering angles. A prime mover is included in the tractor and hydraulic pumps and motors are operable through the prime mover and power the tractor wheels and the mowers. Also, a hydraulic cylinder is included in the tractor for raising and lowering the mowers on the tractor.

BACKGROUND OF THE INVENTION

This is a continuation-in-part of U.S. application Ser. No. 478,049, filed Aug. 9, 1965, and now U.S. Pat. No. 3,429,110. This invention relates to a gang lawn mowing machine including a tractor and a plurality of lawn mowers articularly mounted on the tractor. This machine has particular application in mowing golf course greens, so it will be explained and described in that regard. However, initially it should be mentioned that gang lawn mowers are not novel in the mowing art, and to have a plurality of mowers articularly mounted on a tractor is well known in the art. Such mowers may be powered through drive means connected to a prime mover on the tractor, and they may also be arranged for powered raising and lowering with respect to the tractor.

However, the present invention provides a gang lawn mowing machine which is generally an improvement over mowing machines heretofore known, and it is specifically an improvement over mowers used for golf course greens. Commonly, greens are mowed by a single lawn mower which has the operator walking behind the mower, and the mower is of a limited mowing width so that it can fully adjust to the undulations on the green and therefore closely cut the grass. Of course the time required for mowing, particularly the time required for mowing some or all of the golf course greens, including the time for transporting the single mower between the greens, is considerable. Further, each one of the single mowers must be manned by one operator, so a number of mowers and operators are required to mow all the course greens in a short time.

One reason why the prior art has utilized a single mower for mowing greens is because of the requirement for a precise cut, and there are also the problems of compaction of the green by the weight of the mower, so a large or wheel-type mower cannot be used on the green, and the mower wheel or other support must not extend significantly beyond the line of operation of the cutter, and there are other problems.

Because of these problems, a gang type mower has not been commonly employed for mowing golf course greens. However, U.S. Pats. such as Nos. 1,957,079 and 2,764,864 and 3,177,638 show gang mowers. The present invention provides a gang-type mowing machine which solves the problems or meets the requirements mentioned, and it therefore provides a machine suitable and acceptable for a high-quality mowing of golf course greens.

In providing this improved greens-type mower, the present invention provides a machine which gives a better cutting surface on the green, gives a better appearance to the green because of the swath of cut, does not harmfully compact the green to interfere with its putting surface, provides for faster mowing of the greens and does so with less labor and with less interference with the play of golf. Further, it is desirable to mow a green in an elliptical pattern which will permit the lawn mower to complete cutting the entire green before being removed from the green, and the present mowing machine accomplishes this. In fact, the present machine can cross the border line of the green and cut with forwardly and rearwardly mounted mowers and have all mowers cutting along the precise border line of the green. That is, the front mowers are raised together and the rear mower is raised or lowered at a time delayed from the raising or lowering of the front mowers so that all mowers will commence or complete cutting along the same border line of the green.

Still further, the mowing machine of this invention is a riding type though it is used on golf course greens, and regardless of the weight of the operator the ground wheels supporting the machine have the weight of the machine and the operator equally distributed on the wheels. This is accomplished by having the components on the machine disposed to be weight-balanced thereon, and the operator's seat is along a plumb line intersecting the center of gravity of the machine. Therefore, regardless of the weight of the operator, he does not alter the equal distribution of weight on the ground wheels. Still further, where a gasoline engine is used on the machine, the engine is located rearwardly of the operator's seat so that the noise, visibility obstruction, gas fumes, safety, and like factors are not a problem. The operator has complete visibility of all the mowers though he need not leave the operator's seat, and he has complete control of all of the operating components, while he is seated. Still further, the machine is powered by hydraulic means shown, and the hydraulic pumps operating the mowers and the lift ram can have their hydraulic output directed to the tractor traction wheels so that maximum transport power can be obtained with only a minimum capacity of tractor components being required. Thus the machine can be rapidly moved from green to green, and no additional transport vehicle is required for so moving the mowers between greens.

Still further, the machine is capable of turning on a short radius, but to do so without scuffing or otherwise damaging the turf. To accomplish this, the machine is of a three-wheel type and has the rear wheel as its steering wheel so that the short turning radius can be accomplished, and the front wheels are the traction wheels which are driven in a manner to have them act in accordance with the differential drive so that there is no sliding, skidding, or ground scuffing.

Further, all of the mowers are raised by a single control, and, in the hydraulic unit or system, only a single hydraulic cylinder is required for raising the three mowers shown. Also, the control for raising and lowering the mowers is a foot-operated control readily accessible to the operator so that he need not remove his hands from steering the vehicle or from other hand-operated controls on the vehicle. This therefore permits the operator to accurately raise and lower the mowers with respect to the ground being traversed by the machine.

Still further, the machine is arranged such that each of the mowers has a grass catcher, and the mowers and catchers have ample room on the machine so that the catchers can be readily removed and replaced on the mowers, and also the mowers can be easily inspected or adjusted or removed for repair. These features are accomplished even with a rearwardly located mower which is positioned directly ahead of the single rear wheel of the machine.

Another feature is that the mowers are raised and lowered by a power means, but the tractor power, and also the power means itself, need not be operative while the mowers are being held in the raised position. That is, the structure for raising the mowers is itself sufficient to retain the mowers in the raised position even though the power is not on. Additionally, the operator need not latch the mowers or otherwise maneuver them into the locked or secured raised position. Likewise, the operator need not release the mowers from their locked or secured raised position when the desires to lower them. In both instances, all the operator need do is to actuate the lifting mechanism or hydraulic cylinder where the machine is hydraulically operative, and then the release of the holding means is automatic. Also, the lifting mechanism is arranged so that it does not in any way interfere with the articulate mounting of the mowers, so the mowers are completely free to adjust to undulations in the ground.

An important feature of the invention is that the machine is powered in both a forward and a reverse direction, and the mowers permit reverse movement of the machine, and in the forward direction, the mowers are also powered, with the power drive to the traction wheels and the mowers being synchronized. That is, the faster the ground speed of the machine, the faster the mowers will be operated so that a consistent cutting frequency is maintained for variable ground speeds of the machine. That is, the machine ground speeds and the mower cutting speeds are synchronized and in constant proportion.

In a hydraulic unit shown herein, the hydraulic system is in a compact form and utilizes a minimum of parts and lines, and it accomplishes this, in part, by utilizing the tractor frame itself as part of the hydraulic reservoir and the hydraulic conduit. Also, the hydraulic system is arranged to assist in distributing the weight on the ground wheels so that uniform weight is placed on the wheels.

Additionally, the operator's platform is arranged so that he can mount or demount the machine from either side without stepping over any components on the machine, and he can comfortably position himself on the machine with his feet on the horizontally and planarly disposed operator's platform or footrest. He need not fully straddle any parts or components on the machine, but he can sit in a safe and comfortable position.

BRIEF DESCRIPTION OF THE DRAWING

FIG. 2 is a top plan view of certain parts of FIG. 7.

FIG. 3 is a rear perspective view of a fragment of FIG. 1.

FIG. 4 is a front perspective view of the rear fragment of FIG. 1.

FIG. 5 is a top plan view of certain parts of FIG. 1.

FIG. 6 is a front elevational view of certain parts of FIG. 1.

FIG. 7 is a side perspective view of certain parts of FIG. 1.

FIG. 8 is a top perspective view of FIG. 7.

FIG. 9 is a sectional view taken on the line 9—9 of FIG. 4, and showing the parts in a slightly different position.

FIG. 10 is a schematic view of the hydraulic system for the embodiment shown in FIG. 1.

FIG. 11 is a front perspective view of certain parts of another embodiment of this invention.

FIG. 12 is an enlarged side perspective view of the embodiment shown in FIG. 11, but showing the central portion thereof only.

FIG. 13 is a top plan view of a fragment of the embodiment shown in FIG. 11, and with the mowers shown in dot-dash lines and with portions of the tractor unit shown in dotted lines.

FIG. 14 is a side elevational view of FIG. 13 with parts omitted and added.

FIG. 15 is a rear elevational view of a fragment of FIG. 14, and particularly showing the mower frame and the connecting fork.

FIGS. 16 and 17 are schematic views of the hydraulic systems employed in the FIG. 11 embodiment.

DETAILED DESCRIPTION OF THE PREFERRED EMBODIMENT

Figure 1:
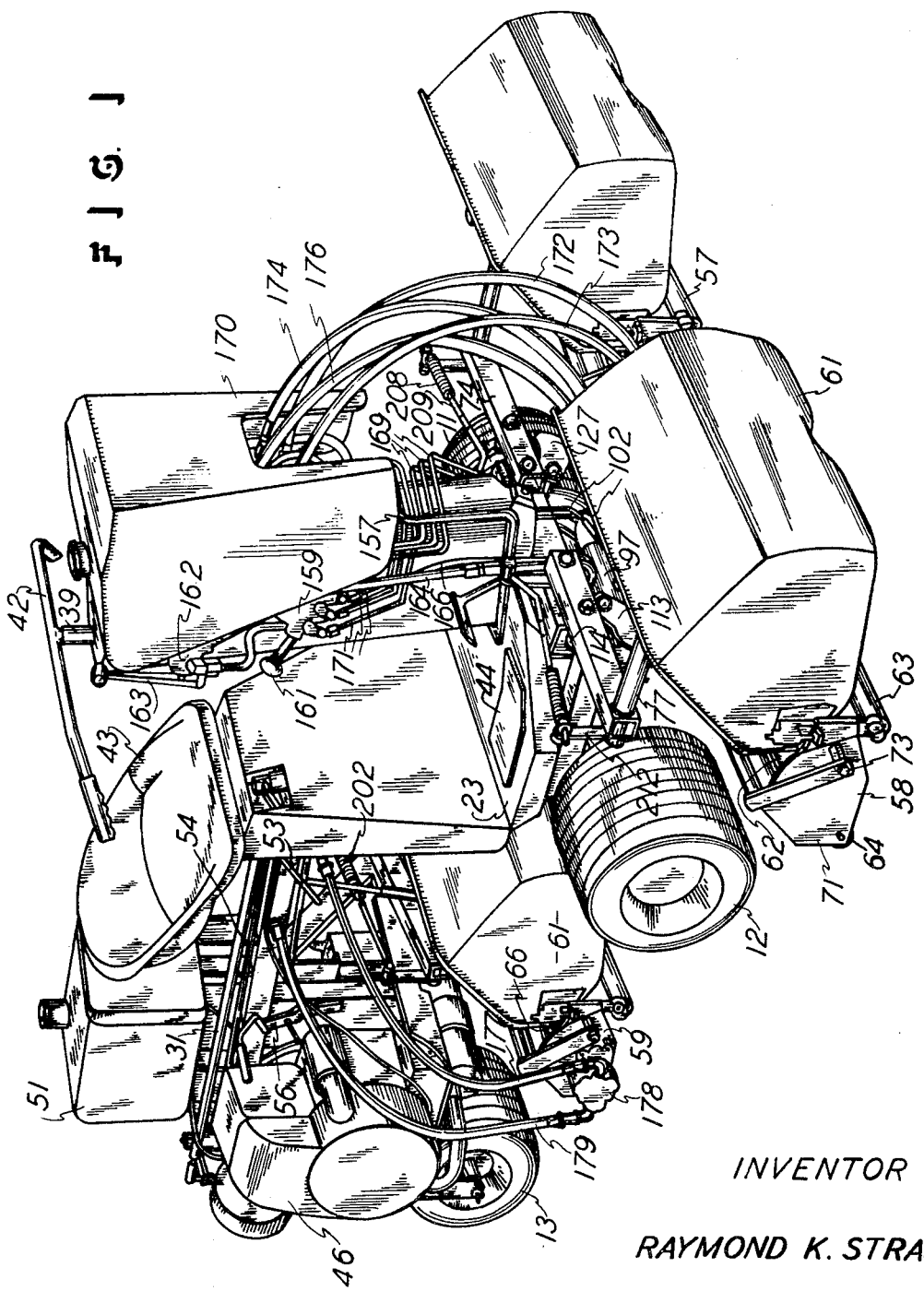
FIG. 1 is a front perspective view of one embodiment of this invention.

The embodiment shown in FIGS. 1–10 generally shows a tractor having a frame generally designated 10 and supported on three pneumatic wheels 11, 12, and 13. Wheels 11 and 12 are forwardly located on the frame 10 and they are traction wheels, and wheel 13 is the rear wheel and it is a steering wheel. The frame 10 includes longitudinally disposed hollow tubular pieces 14, 16, and 17. These three pieces are assembled and welded together as shown, and they extend in the fore-and-aft direction of the tractor and along the central plane thereof. Included as part of the frame is a cross tube 18 which is suitably affixed to the forward end of the tube 14. Side frame tubes 19 and 21 are affixed to the cross tube 18. Also, a brace 22 is seen in FIG. 3 to be connected between the piece 14 and the rear ends of each of the side tubes 19 and 21. The frame pieces described support the platform or operator's station 23 which is suitably affixed to the frame 10 and extends thereover as shown in FIG. 2.

FIG. 2 also shows that the frame 10 supports the front wheel axles 24, for rotatable support of the front wheels 11 and 12. FIG. 3 shows that the frame includes an uprightly disposed sleeve 26 which is affixed to the rear end of the frame piece 17 for supporting the rear wheel 13. Thus the rear wheel 13 has a yoke 27 which serves to suitably rotatably mount the rear wheel 13, and the yoke is affixed to an upstanding post 28 which extends upwardly through the sleeve 26. A ball bearing 29 is disposed between the sleeve 26 and the post 28 to provide adequate rotational and thrust support for the rear end of the tractor with respect to its rear wheel 13.

At this point it will also be noted that the post 28 is rotatable in the sleeve 26 by means of steering linkage which includes an arm 29 affixed to the steering post 28. A link 31 pivotally connects to the arm 29 and extends along the frame piece 17 as shown. Another steering link 32 is pivotally connected to the link 31 by means of an arm 33 being affixed to the link 32 and with the forward end of the link 31 being pivotally connected to the arm 33. Supporting journals 34 and 35 are affixed to the frame for rotatably supporting the link 32 which has an arm 36 affixed and extending therefrom to connect to a link 37 which is connected to a link 38 which is affixed to the steering column 39. The column 39 may be rotatably mounted in a bushing 41 such that rotation of the column 39 about its upright axis will cause pivotal motion of the links 38 and 37, and the arm 36 will then pivot to rotate the link 32 and longitudinally displace the link 31 to steer the rear wheel 13, as desired. FIG. 1 shows that the upper end of the steering column 39 has a steering control or handle bars 42 affixed thereto.

Thus the operator will place his feet on the platform 23 and an operator's seat 43 is suitably mounted on the frame 10 for supporting the operator in a position to control the operation of the tractor. It should be noticed that the platform 23 extends horizontally across the width of the tractor without having any parts project above the platform 23, so the operator can mount the tractor from either side without stepping over or otherwise having to straddle any parts while operating the tractor, if he desires to keep his feet under him while he is in a seated position. In fact, the operator can stand on the platform 23. Therefore, to accomplish the feature of a flat or planar floor board or platform 23, the steering control and linkage described extend below the platform 23, and all other parts also extend below the platform 23 in the area where the operator may place his feet, such as on the foot pads 44.

A prime mover, shown as a gasoline engine 46, is mounted on the rear end of the frame 10. FIGS. 2 and 3 show an engine mounting platform 47 which is supported on the frame 10 by means of braces 48 and 49. In this particular embodiment, the prime mover 46 serves to create the mobilizing or traction power for the tractor, and it also powers the implements mounted on the tractor. It is significant to notice that the prime mover 46 is located rearwardly of the operator's seat 43, and this is for purposes of safety, operator comfort, and particularly for arranging the entire machine for equal distribution of weight on the tractor wheels. Of course it will also be noticed that the tractor wheels are of the wide or terra type, and they therefore exert only a minimum pressure on the ground. It is particularly important when the tractor is on a golf course green and it is desirable that the green remain level and not have the tires make an impression in the turf or green. Further, in the arrangements with the rear wheel 13 being the steering wheel and the tractor being of only three wheels, the entire machine can be steered on a small turning radius without scuffing or otherwise damaging the grass. In fact, with the machine as shown in FIG. 1, there can be a 62-inch mowing swath, but there is only a 36-inch turning radius. Also, with the distribution of components on the machine, and with the tractor wheels arranged and constructed as shown, the entire machine does not create more pressure than a single walking-type powered mower would create. Further, the compaction created by the entire machine is of a pressure less than the heel of a 175 pound golfer stepping on a golf course green. This performance is achieved with the entire machine weighing approximately 1,000 pounds, the engine being approximately 12 horsepower, the tractor having a gas tank 51 which holds sufficient gasoline for four to six hours of mowing time, the mowing speed being over three miles per hour and the transport speed being up to eight miles per hour, and with all the operating components powered, as well as having the machine the riding type. Also, the engine 46 is of the electric starting type, and a battery 52 is suitably supported at the rear of the tractor, and conventional battery connections and relays are provided for controlling the starting of the engine 46, though these connections and parts are not shown.

Also, there is an engine throttle control 53 within easy reach of the operator seated in the seat 43, and the control 53 is connected to the engine through a rod 54. Likewise, there is a clutch lever or control 56 which is operable on the engine drive which will be described later. With this arrangement, from his seated position, the operator can regulate the running of the engine 46, including starting, stopping, and engine speed, which affects the velocity of the tractor relative to the ground as well as affecting the speed of the mowers or implements on the tractor, as will be seen later.

FIG. 1 shows three reel-type lawn mowers 57, 58, and 59 supported on the tractor, and the mowers 57 and 58 are aligned with and directly in front of the front wheels 11 and 12, respectively, and the mower 59 is rearwardly mounted and is aligned with and directly in front of the rear wheel 13. Thus the mowers are arranged and are of a width which will permit them to mow the grass before the wheels reach the portion of the grass which each mower is cutting. Of course it will be understood that the three mowers 57, 58, and 59 are of a uniform or common length, say 22-inch length, and they have sufficient overlap to provide for complete mowing across the width of the tractor even though the mowers are adjusting to the irregularities in the ground and even though they may be turned at steering angles. Nevertheless, the entire mowing swath is 62 inches, as mentioned. Thus the individual mowers are short enough to follow the irregularities in the ground in a manner to produce close cutting of the grass, and the aforementioned features are also accomplished.

Each mower has a grass catcher 61 removably mounted on each mower and being fully supported on the mower. Thus it will be understood that the mowers are all of the forward discharging type so that the grass clippings are thrown forwardly, by means of the commonly provided curved baffles 62 on the mowers, and the clippings are thus deposited in the respective catchers 61. Also, it is significant to notice that the rear mower 59 and its catcher 61 are located in a space adequate for easily accommodating the mower and its catcher so that there is access to the mower 59 and so that the catcher 61 can be readily removed from the mower 59 for emptying the grass and the like. That is, the tractor, particularly the tractor frame 10, is arranged so that there is adequate space for the rear mower and its catcher, as clearly shown in FIGS. 1, 3, and 4. Further, the mowers are all of the type which do not utilize ground wheels, but instead they have forwardly and rearwardly mounted rollers 63 and 64. These reel-type mowers also each have their usual cutting reels 66, one of which is partly shown on the rear mower 59.

FIGS. 1, 4, and 6 show that each of the mowers has a pivotal mounting or support member 67 in the form of a yoke having a cross-tube 68 and affixed end arms 69. A side plate 71 is pivotally mounted on each of the arms 69, and it carries the mower proper by having the mower cross-tube 72 affixed to the plates 71 on each of the mowers. In this manner, the mounting member 67 is a pivotal-type mounting, and the mower is thus capable of pivoting about pins 73 which connect between the arms 69 and the plates 71. Thus the mower is free to pivot about an axis parallel to the longitudinal axis of the mower reel 66, as the rollers 63 and 64 adjust themselves to the irregularities in the ground on which the mower is riding.

Each of the three mowers has a pivot or lift arm connected to it for raising and lowering the mowers between a lowered operating position on the ground and a raised transport position. The three mowers have identical lift arms, which form a portion of the attachment means, so only one need be described. Of course the pivot arms for the two front mowers 57 and 58 are simply reversed, as seen in FIG. 1, but they are otherwise the same and are similar to the lift arm and attachment means for the rear mower 59, as shown in FIG. 4.

Each mower has a pivot arm 74 which is pivoted on the tractor frame through a pin 76 supported on the frame 10. Each arm 74 has a forwardly extending sleeve 77 affixed thereto, and the sleeve encloses a shaft 78, as shown in FIG. 7. The forward ends of each shaft 78 has a T-shaped cast piece 79 affixed thereto by means of a pin 81 extending through the piece 79 and the shaft 78. The piece 79 has a sleeve portion 82 containing an upper bushing 83 and a lower bushing 84 which slidably and rotatably receive a post or pin 86, in a lost motion connection described hereinafter. The lower end of the pin 86 is welded at 87 to an arm 88 which extends rearwardly to the pivot mounting tube 68, and the two are affixed by means of welding at 89. With this construction, certain raising and lowering of the pivot arm 74 about its pivot pin 76 will raise and lower the mower. That is, the upright post or shaft 86 has a pin 91 extending diametrically thereacross and beyond both sides of the post 86, as shown in FIG. 8. The pin 91 comes into abutment with the upper edge of the sleeve portion 82 of the member 79 when the attachment means assembly of the lift arm 74, sleeve 77, shaft 78, and piece 9 is raised. Still further, the mower is steerable or pivotal about the upright axis extending longitudinally of the post or shaft 86, and thus the mower can track and steer with respect to the steering of the tractor, and the mower will therefore not scuff the turf and it will instead operate in a directly forward position, as the mounting is in the nature of a caster connection between the tractor and the mower. The shaft and sleeve arrangement of pieces 82 and 86 is thus located forwardly of each of the mowers for the castering or steering action mentioned. Also, the arm 88 presents an abutment surface 85 which interferes with the downward motion of the sleeve 82.

Further, the upper edge of the sleeve 82 is shown to have two V-grooves 92 which present abutment surfaces with respect to the circumference or abutment surfaces of the two ends of the pin 91. The V-grooves 92 and the pin 91 therefore restrict the turning or steering angles of each of the mowers, and such restriction is to a maximum of approximately 30 degrees of turning or steering action. Further, when the mowers are raised as described, then the pin 91 engages the abutment surfaces or top edges of the V-grooves 92 as the pins are permitted to move downwardly to the base or apex 93 of the V-grooves 92. This action aligns the mowers with the tractor when the mowers are in the raised or transport position. Therefore, the V-grooves 92 and the pins 91 are themselves oriented or aligned with the tractor for the purpose of aligning the mowers when they are in the raised position, as well as for the purpose of permitting the mowers to steer, but to only a limited angle, as described. FIG. 4 shows a cap 90 on the upper end of the sleeve 82.

With regard to raising the mowers, FIG. 9 shows that the pivot mounting tube 68 is in the path of a hook-shaped bracket 94 which is affixed to the mower crosstube 72. This arrangement therefore permits the pivoting of the mower on its pivot mounting and about the axis defined by the pins 73 at the ends of the arms 69. However, when the mower is raised by lifting the arm 88 and its affixed cross-tube 68 to a sufficient height, then the lift surface 95 on the hook end 96 of the bracket 94 will engage the tube 68 to prevent further pivoting of the mower and will therefore permit lifting of the mower. This is in the nature of a lost-motion connection at the rear of the mower.

The pivot pin 76 for the front mowers 57 and 58 is on the frame cross piece 18 while the pivot pin 76 for the rear mower 59 is on an arm 100 extending downwardly from and affixed to the frame piece 17. FIGS. 5 and 6 show the mechanism for pivoting the lift arms 74 for the front mowers 57 and 58. Thus a hydraulic cylinder 97 is pivotally mounted on ears 98 on the frame 10, and the ears 98 hold a pivot pin 99 for the cylinder 97. A cylinder ram 101 is extendable from the cylinder 97 when hydraulic pressure is controlled with respect to the cylinder and by means of the hydraulic hoses 102 connected to the cylinder 97. A link 103 is pivoted to a pin 104 at the end of the ram 101, and the link pivotally connects to an arm 105 through a pin 106. The arm 105 is affixed to a sleeve 107 which in turn is affixed to a shaft 108. The shaft 108 is rotatably mounted in a journal 109 supported on an arm 111 connected to the frame piece 21 of the tractor. Another journal 112 is affixed to the frame piece 18, and the journal 112 also rotatably supports the shaft 108. A plate 113 is affixed to the forward end of the shaft 108 so that the plate 113 will rotate with the rotation of the shaft 108. Thus, upon projection of the ram 101, the link 103 and the arm 105 are displaced to rotate the shaft 108 and likewise rotate the plate 113. Upon rotating the plate 113 upwardly, the plate 113 engages a projection or roller 114 mounted on the lift arm 74. Consequently, the arm 74 is caused to pivot upwardly and thereby raise the mower. The roller 114 is shown rotatably mounted on the arm 74 by means of a bolt 116, and the roller 114 is on the rear side of the arm 74 and of course in the path of upright pivotal movement of the plate 113. Also, the plate 113 is cam-shaped in that it has a first surface 117 which engages the roller 114, and it has a second surface 118 which also engages the roller 114 when the lift arm 74 is in its raised or upwardly pivoted position, as shown by the dot-dash lines of the plate and roller on the right in FIG. 6. Between surfaces 117 and 118, the plate 113 has a projection 119 which serves as an over-center projection or surface with respect to the pivotal action of the arm 74, as will be more fully described later.

Mower 57 is somewhat similarly raised by the same hydraulic means described. Thus an arm 121 is also connected to the pin 104 on the end of the ram 101, and the arm 121 is affixed to a sleeve 122 supported on a shaft 103 journaled in sleeves 124 and 126 suitably secured to the frame pieces 19 and 18, respectively. Thus the shaft 123 and the sleeve 122 rotate together, and the front end of the shaft 123 has a cam plate 127 which, like plate 113, engages the roller 128 on the other pivot arm 74 when the cam plate 127 is rotated upwardly to lift the mower.

At this time it will then also be understood that the plates 113 and 127 will retain the pivot arms 74 in the upward positions even when there is no hydraulic pressure in the cylinder 97. That is, the weight of the mowers and their attached parts including the attachment means or mounting described, will act downwardly on the respective plates 113 and 127 to prevent the plates from rotating back to their downward or original positions. This is therefore an over-center feature with respect to the plates 113 and 127, since the only way in which the mowers will be lowered will be through positive rotation of the plates 113 and 127 by the hydraulic means and linkage just described. In this regard, the shafts 108 and 123 are located with respect to the raised rollers 114 and 128 such that there is a substantially vertical alignment between the two in the mower fully raised position. Also, the rollers 114 and 128 are located adjacent the pivot pins 76 on each respective arm 74 so that only a slight or small action of raising the respective rollers 114 and 128 is required in order to obtain adequate upward movement of the outer ends of the pivot arms 74.

The same hydraulic cylinder 97 is also used to raise the cylinder mower 59. Thus linkage is connected between the cylinder 97 and the rear mower 49 so that only one cylinder 97 is required for raising all three mowers. To accomplish this, FIGS. 3 and 5 show that the rear end of the shaft 123 has a sleeve 129 affixed to the shaft 123 to rotate therewith. An arm 131 rotates with the sleeve 129, and the arm 131 is pivotally connected to a link 132 which also is pivotally connected to an arm 133 affixed to a sleeve 134 on a shaft 136. FIG. 4 shows the shaft 136 is rotatably mounted on a plate 137 on the frame 10, and the shaft 136 extends rearwardly along the frame and is suitably rotatably supported at its rear end on the frame 10, just as with regard to the support plate 137. A cam or pivotal plate 138 is pivotally mounted on the shaft 136 and is immediately in front of the unshown bearing support for the rear end of the shaft 136, and which bearing support is identical to the shown plate 137. The cam plate 138 is free to rotate on the shaft 136, and FIGS. 4 and 6 indicate how it is controlled in its rotation thereon by an arm 139 projecting from a sleeve 140 affixed to the shaft 136 to rotate therewith. Thus the plate 138 has screws 141 and 142 adjustably mounted on the plate by threading into ears 143 affixed to the plate 138. The screws are threadable into and out of the respective ears 143 and are in the arcuate path of movement of the finger or arm 139. Thus, from the shown downward position of the plate 138 as seen in FIG. 6, counter-clockwise rotation of the shaft 136 will cause the arm 139 to move into abutting contact with the screw 142. Additional rotational movement of the shaft 136 will pivot the plate 138 upwardly to the position shown in FIG. 4. In the FIG. 4 position, the plate 138 is shown to be engaged with a roller 144 affixed to a pivot arm 146 mounted on a pin 147 on a tractor frame piece 148. The arm 146 is pivotally connected to a link 149 which is also pivotally connected to a bracket 151 on the mower pivot arm 74. Thus rotation of shaft 136 and plate 138 will cause pivotal movement of the arm 146 to produce raising and lowering of the rear mower through the pivoting of the pivotal arm 74.

The cam plate 138 has a surface 152 which is arcuate to receive the roller 144 in the FIG. 4 position. The plate 138 also has a surface 153 which is arcuate to engage the roller 144 when the rear mower 59 is being raised or lowered. Intermediate the surfaces 152 and 153, the cam plate 138 has the projection 154 which is the over-center portion of the cam plate 138, serving the same purpose as the over-center portions 119 of the cam plates 113 and 127.

That is, the plate 138 in the FIG. 4 position will hold the rear mower 59 upwardly even though there is no torque applied to the shaft 136, and consequently there need be no pressure in the hydraulic cylinder 97. However, when it is desired to lower the mower 59, then rotation of the shaft 136 will rotate the plate 138 and release the roller 144 and permit the link 149 to lower the pivot arm 74, as desired.

The raising and lowering of the mowers is accomplished in a manner which causes the rear mower to be raised and lowered at a time subsequent to the raising and lowering of the front mowers 57 and 58. The reason for this is that when the machine is being used for mowing golf course greens, for instance, with the machine approaching the edge of the green to commence mowing, the tractor is moved onto the green and the cylinder 97 is actuated to have the front mowers 57 and 58 lowered to commence cutting at the very edge of the green. As the machine progresses onto the green in a non-stop movement, the linkage described and connecting the rear mower to the front mowers lowers the rear mower. However, because of the spacing of the screws 141 and 142, there is a time delay in lowering the rear mower, so it lowers onto the same ground line along which the front mowers commenced cutting. So there is what is termed a full-motion connection at the front mowers, and a lost-motion connection at the rear mower. Consequently, raising and lowering of the front mowers will cause a proportionate displacement of the linkage connected to the shaft 136, and it will cause a proportionate rotation of the shaft 136, but that rotation will not be effective on pivoting the plate 138 unless and until the arm 139 abuts the screw 141 or the screw 142 in the path of pivotal motion of the arm 139.

Further, the delayed or lost-motion connection is such that it is adjustable since the screws 141 and 142 are threadedly movable on their respective mounting ears 143 so that the angle defining the amount of lost motion is variable. Also, the linkage connection between the front and rear mowers, such as the link 132, is an adjustable threaded piece so that it too can be adjusted for controlling the timing and the lost-motion action between the front and rear mowers.

A spring 155 is connected between the frame piece 148 and the cam plate 138 and yieldingly urges the plate 138 upwardly when the arm 139 is free of the screw 142 and the plate 138 is pivoted beyond the position when the roller 144 is beyond the projection 154. Thus the spring 155 cushions the descent of the rear mower 59 when the mower approaches the ground in the lowering process.

FIG. 6 shows the positions of the cam plates, the linkage connecting the plates to the mowers, and all the attending parts, when the mowers are in the ground-riding or lowered position. It will then be noticed that the plates 113, 127, and 138 are all spaced below the cam followers or rollers 114, 128, and 144, respectively. This means that the mowers are free to follow any irregularities or undulations in the ground by having the pivot arms 74 pivot up and down without being impeded in the pivotal action by the cam plates.

The machine is hydraulically powered for both the traction drive and the operation of the three mowers shown. Thus FIG. 4 shows a traction drive pump 156 mounted on the rear of the tractor, and it is driven by the engine 46. A hydraulic pressure line 157 extends from the pump 156 and along the frame pieces 17, 16, and 14. FIG. 1 shows the line 157, and this line connects to a high speed valve 159 suitably mounted on the tractor and having the valve control 161 conveniently located for the operator. As shown in FIG. 10, and more fully described later, the valve 159 is connected with a valve 162 which is also suitably mounted on the tractor and has a control or lever 163 located conveniently for the operator for control of the valve 162 which is the traction valve actually controlling the power to the front traction wheels 11 and 12. Thus, FIG. 1 shows two hydraulic lines 164 and 166, and these lines connect with the traction valve 162 and they connect to hydraulic traction motors 165 and 167 shown in FIG. 3. These two motors are in driving relation to the respective front traction wheels 11 and 12, and thus the tractor is mobilized.

FIG. 1 shows a hood or cover 170 which is suitably mounted on the front end of the tractor to cover the hose connections and portions of the valves described. However, the hydraulic system is fully shown in FIG. 10 and will be described later in connection with FIG. 10.

FIG. 4 also shows three hydraulic pumps 168 having three hydraulic outlet lines 169. These lines also extend along the frame pieces 17, 16, and 14, and they are also shown in FIG. 1, and they connect to the valve 159, as shown in FIG. 10. Three hydraulic lines 171 are connected to the valve 159 and lead therefrom to another valve 175 on the left-hand side of the tractor in a position substantially directly opposite the valve 159, as seen in FIG. 3, for controlling operation of the mower reels 66. From the reel valve 175, two flexible hoses 172 and 173 connect to motors on mowers 57 and 58, respectively, as shown in FIG. 10. Also, hoses 174 and 176 connect to the mower motors and form return lines in the hydraulic system, as will be described in connection with FIG. 10. At this point, it should be noticed that the hoses 172, 173, 174, and 176 are flexible so that the mowers can move up and down to adjust to irregularities in the ground and so that they can be raised and lowered, as previously described. FIG. 1 also shows a flexible hose 177 which is connected to the reel valve and extends therefrom and below the operator's platform 23 and to the hydraulic motor 178 connected to the rear mower 59 for driving the reel of the rear mower, as the motors on the front mowers are also connected and arranged for driving their reels. A flexible hose 179 is connected to the motor 178 and serves as a hydraulic return line for the motor 178, as will be described more fully later.

Finally, FIG. 1 also shows the hydraulic cylinder 97 and its two hydraulic lines 102 connected to the cylinder. These lines extend from a valve suitably mounted on the left side of the tractor and immediately above the reel valve mentioned. FIGS. 3 and 6 show the ram valve 181, and they also show a foot pedal control 182 which is suitably movably mounted on the platform 23 for actuation by the left foot of the operator. A connecting rod 183 extends between the valve 181 and the foot pedal 182 so that the operator can control the ram valve 181 by means of his foot, and he need not take his hands off the handlebars or steering control 42 while operating the ram valve 181.

The drawings, including FIG. 2, show a hydraulic reservoir or tank 184 mounted at the front end of the tractor frame and directly over the fame piece 14. The tank is suitably enclosed and it is also in fluid-flow communication with the frame pieces 14, 16, and 17 by having an opening in the frame piece 14, such as the shown opening 186 in FIGS. 5 and 6, in flow communication with an opening in the tank bottom. Further, the frame pieces 14, 16, and 17 are hollow pieces and are welded together to be fluid tight but they permit fluid flow between all of these three pieces. Thus FIGS. 1 and 6 show that the front end of piece 14 has a plate, with a drain plug 187, for fluid-tightly closing the front end of piece 14. FIG. 3 shows that the sleeve 26 is fluid-tightly secured with the rear end of frame piece 17 by means of the welding 188, thus the frame itself is used for containing and conducting the hydraulic fluid. FIG. 1 further shows that the return line 179 for motor 178 is connected to the frame piece 17 at an opening 189 shown in FIG. 3. FIG. 3 also shows two fluid lines 191 and 192 and a hole 193, all in the rear end of frame piece 17, and these lines and the hole are related to the pumps 156 and 168. Thus the lines 191 and 192 serve to supply fluid to the reel pumps 168, as also shown in FIG. 10, and the hole 193 provides a passageway for connecting to a line 194 supplying the traction pump 156. Additionally, FIG. 6 shows holes 195 in tank 184 to provide connection points for the return lines 174 and 176 for the hydraulic motors on the front mowers.

It will therefore be understood that the tractor is arranged so that the engine 46 is located rearwardly of the operator's seat, and the tank or reservoir 184 is forwardly of the seat, along with the operating valves and connections for the hydraulic system, so that the tractor is arranged with the weight of the components uniformly acting on the three wheels of the machine. The components, and the entire machine, are arranged so that the center of gravity of the machine is on the vertical or plumbline extending through the operator's seat 43. Therefore, regardless of the weight of the operator, there will be equal weight on the three wheels. FIG. 2 shows a triangle in dot-dash lines 196 and 197 which intersect at the centers of the three wheels. Lines 198 are shown to bisect the triangle lines at the tractor front wheels. Then the intersection at point 199 of the two lines 198, is on the plumbline extending through the center of gravity of the machine, and such plumbline intersects the seat 43. In fact, FIGS. 2 and 4 show that the seat 43 is supported on frame piece 148 which has five holes 201 extending therealong. These holes provide for adjustably positioning the seat 43 along the support piece 148, and the intersecting point 199 is at the second one from the front. Also, the platform 23 is low slung on the tractor and is actually level with the mowers and their catchers 61. So the tractor has a low center of gravity, and is safe on a hillside.

FIG. 1 shows the motor 178 mounted on one end of the mower 59, and a counter-balance spring 202 is connected with the mower 59 to counterbalance the weight of the motor 178. FIG. 4 shows that the spring is connected between a fixed upright arm 203, on the end of arm 100, and an arm 204 which is on a collar 206 at the rear end of the shaft 78 shown in FIG. 7, for instance. Thus the collar 206 is secured to the shaft 78 to rotate therewith, and a key is shown for securing the pieces together, and the arm 204 is also shown welded to the collar 206. Further, a set screw 207 holds the collar 206 from moving off the end of the shaft 78. Thus the spring 202 is a tension spring and it tends to rotate the arm 204, and therefore the shaft 78, in a clockwise direction relative to the front end of the shaft 78 to thereby counter the weight of the motor 178 on the rear mower 59.

The front mowers 57 and 58 have their driving hydraulic motors on the inner ends thereof, and FIGS. 1 and 6 show a counter-balancing spring 208 is applied through a rod 209 and a fixed arm 211 and an arm 212 fixed to the front mower shaft 78, in the manner that the arm 204 is fixed with respect to the rear mower. Thus the spring 208 is a compression spring, and it tends to push on the arm 212 to rotate the shaft 78 in a direction to counter the weight of the front motors. The rod 209 slidably extends through a sleeve 210 on the arm 212, and the spring 208 is secured by a pin 213 extending through the rod 209 in adjustably positioned holes 214 in the rod 209. Thus the tension on the springs 208 can be altered as needed and desired.

FIG. 10 shows the hydraulic system, and here it will be seen that the traction pump 156 and the reel pumps 168 are connected to the reservoir or hydraulic supply through the line 194 and the lines 191 and 192. The two lines 169 extend from the outlet of the reel pump and directly to the high speed valve 159. The third line 169 extends from the reel pump to the ram valve 181. The drawing schematically shows the ram valve foot control 182, and when the control is in a position shown, namely the "N" or neutral position, then the ram valve simply passes the fluid through an outlet line 216 and into the inlet of the high-speed valve 159. In that way, only one line from the reel pump is diverted for operating the hydraulic cylinder or ram 97, but all three lines from all three reel pumps 168 are directed into the high-speed valve 159. At this time it will then also be noted that the ram valve has a "D" or down and a "U" or up position which refers to the down and up positions of the mowers. Of course the cylinder 97 is a two-way or double-acting type cylinder so that there is positive control in the cylinder for both the raising and the lowering actions.

FIG. 10 further shows the high-speed valve 159 has a "HI" and a "LOW" position, set by the valve control 161, and when the valve is in the low position, then the fluid entering the high-speed valve 159 is directed therefrom in the three lines 171 and into the reel valve 175. Valve 175 has "ON" and "OFF" positions, set by the valve control 217, and the hydraulic hoses 172, 173, and 177 are shown to extend from the valve 175 and into the respective mower motors. That is, the front mowers 57 and 58 have motors 218 and 219 respectively, and the rear motor 178 is also seen in FIG. 10.

The traction pump 156 has its outlet line 157 extending to a connection 221 on the high-speed valve 159. This connection has a passageway 222 extending into the valve 159 for communication with the reel pump lines leading into the valve 159, and this is when the high-speed valve 159 is in the "HI" position and it is not desired to drive the mower reels. This then permits the outlet from all the pumps 156 and 168 to flow into the traction valve 162 through the line 220. This valve has an "F" or forward position, and it has an "R" or a rearward position, as well as an "N" or neutral position, all set by the control 163. Thus the output of the pumps can be directed to any one of the three position of the valve 162 and this can cause the hydraulic pressure to be directed to the traction motors 165 and 167 through the hydraulic lines 164 and 166. FIG. 10 further shows that the motors 165 and 167 are connected in a parallel relation so that differential drive action is achieved by the arrangement. That is, where the valve 162 is in the forward drive position, then hydraulic pressure is created in the line 166 and this pressure is exerted on the motor 167 through the T-connection 223. Also, the pressure is exerted on the motor 165 through a line 224 connecting between the T 223 and the motor 165, and both motors are of course driven in the same direction for forward drive of the tractor. Further, the motors exhaust through the line 164 which now acts as a return line having a T-connector 226 at the motor 165 and a crossover line 227 connected between the T 226 and the motor 167 to take the return flow from the motor 167 and direct it into the return line 164. Of course if the tractor were being driven in reverse, then the lines and connections described would also be acting in a reverse manner so again the differential type drive desired for the front traction wheels 11 and 12 would be achieved.

FIG. 10 also shows that the traction valve 162 and the reel valve 175 have connections 228 and 229, respectively, which lead to the reservoir 184, as previously mentioned. Also, motor return lines 174, 176, and 179 are shown in FIG. 10.

Relative to the synchronous drive of the traction wheels and the mower reels, FIG. 10 shows a pulley 231 drivingly related to the reel pumps 168, and a pulley 232 is shown drivingly related to the traction pump 156. Also, engine 46 has a drive shaft or power take-off shaft 233 which carries a pulley 234 drivingly connected to the pulleys 231 and 232 by means of a belt 236. A clutch roller 237 is engageable with the belt 236 for conventional tightening of the belt so that there can be a drive from the pulley 234 and to the pulleys 231 and 232, is a conventional manner. The roller 237 is supported on a shaft 238 which is controlled by the clutch lever 56 which is within the reach of the operator in the seated position on the seat 43. Thus the pumps are directly driven from the engine 46, and they are therefore driven in unison or in proportion so that any increase in the speed of either of the pulleys will be equally increased in the other pulleys. In this manner, the mobilizing speed of the entire machine, that is the traction speed, and the speed of rotation of the mowers or their cutting reels 66 are synchronized so that the mowers will properly cut in accordance with the forward advance of the entire machine. No gears or additional motors, or other weighty and complicated mechanical parts, are required for the desired synchronization mentioned. Thus if the reel motor speed is 1500 r.p.m., and if the traction motor speed is 110 r.p.m., there is an approximate ratio of 14 to 1. This ratio is retained throughout any and all speeds of the engine 46, and consequently throughout any and all forward speeds of the entire machine. Thus if the mower cutting frequency is such that for each one-quarter inch advance of the machine a cutting blade is effective on the grass, this cutting frequency will be retained throughout all forward speeds of the machine.

When the valve 159 is in the "HIGH" position, the machine is in the transport position in that all of the output of the reel pumps 168 is diverted to the traction valve 162, so valve 159 is like a switch, and the connections, such as line 220, are power diverter means. Where the valve 159 is in the "LOW" position, then the output of the reel pumps 168 is directed to the reel valve 175. This arrangement of having the reel pumps 168 effective for the traction speed of the machine in the transport position permits optimum and maximum speeds with the equipment described. Thus the three reel pumps could each be pumping four gallons per minute, of hydraulic fluid, and the traction pump could be pumping nine and one-half gallons per minute. Then the total of twenty-one and one-half gallons per minute can be directed through the traction valve for driving the machine in the transport position when the high-speed valve 159 is in the "HIGH" position.

Also, whenever the reel pumps 168 are operating, the ram valve 181 will be operative and therefore the hydraulic cylinder 97 can operate to raise and lower the mowers. Further, it will then be understood that the tractor wheels are driven with the full power of the tractor, that is with the output of all pumps 156 and 168, but there is no requirement for a switch between parallel and series hydraulic circuits to achieve this. Instead, the high-speed valve 159 and the connections thereto accomplish the desired purpose.

Another fixed proportional drive relation exists between the drive to the traction motors and the powering of the hydraulic cylinder. Thus, whatever the tractor mobilizing speed is, the raising and lowering of the mowers is in accordance with that speed since the cylinder will be receiving hydraulic fluid in a fixed proportion to the pumping of fluid to the traction motors. Also, the distance between the front and rear mowers affects the raising and lowering timing.

Also, there is a restricting orifice at 239 in the return line 102 for the cylinder 97 so there is only a restricted return fluid flow. In this way, the mowers are lowered slowly without damage to themselves or to the turf; they are also raised slowly; and the restricting orifice is effective on the rear mower 59, in conjunction with the spring 155, in the lowering process.

Also, with reference again to the high speed valve 159, whether the valve is in the high speed transport position or the low speed mowing position, the drive to the traction motors 165 and 167 is always with the desired differential action, by virtue of the parallel hydraulic connections.

The clutch with belt tensioner 237 could be eliminated, and one could rely entirely upon the engine speed, for driving the pumps 156 and 168, and upon the valves for control of the wheels and the reels.

DETAILED DESCRIPTION OF THE EMBODIMENT SHOWN IN U.S. PAT. NO. 3,429,110 AND FIGS. 11–17 HEREIN

Generally, the gang mower of this invention has a tractor unit, generally designated 10′ and a mower unit generally designated 11′. The tractor unit is further described as including a frame, generally designated 12′, and the mower unit is also described as including a frame, generally designated 13′. The tractor unit includes the power plant or prime mover, which is shown to be a gasoline engine assembly, generally designated 14′ in FIG. 12, and it includes two wide ground wheels 16′ and two narrower caster wheels 17′, all four of which are rotatably mounted as a part of the tractor unit 10′. The wide wheels 16′ basically support the entire gang mower on the ground, and they do so with a minimum of pressure so that the impression on the ground is a minimum and the lawn is therefore not depressed.

The tractor frame 12′ includes a generally rectangularly disposed piece 18′ which extends rearwardly into handles 19′ which of course the operator may grasp to control the direction of the gang mower. This may be either a walk behind type of mower or a sulkie or other seat (not shown) may be attached to the mower unit for riding if desired. The tractor frame further includes the lower carriage or frame piece 21′ which is welded or otherwise suitably secured to the frame piece 18′ at their points of apparent contact. Also, laterally extending frame pieces 22′ support sleeves 23′ which in turn rotatably support axles 24′ in the vertical direction for the castering wheels 17′. Of course the prime mover or engine 14′ is suitably mounted on the tractor frame 10′, as are the wheels 16′ and 17′, and frame cross pieces 26′ and 27′ and engine mounting members 28′, are all provided for mounting the engine 14′ as shown and mentioned.

FIGS. 11 and 12 further show the handles 29′ extending rearwardly on the tractor frame 10′, and the dotted line 31′ in FIG. 12 shows the actual location of the near handle 29′ with respect to the handle frame section 19′ previously described.

Thus the tractor frame 18′ is generally rectangular in plan view, and it includes the side pieces connected by the front piece indicated 32′, and the three sections are disposed in a common horizontal plane. The rearwardly extending sections 19′ indicate the termination of the horizontal portion of the frame 18′. Cross pieces 33′ are connected between the sides of the frame 18′, and an additional frame piece 34' extends at the forward end of the tractor frame 12', as shown in FIGS. 11 and 12.

FIGS. 11 through 15 show the mower unit 11' which is mounted on the tractor unit 10'. Here it will be noted that the mower frame 13' is also of a rectangular configuration in plan view, and it includes the side frame pieces 36' and 37' and the front piece 38' and the rear piece 39'. Thus the mower frame 13' is of the same planular shape as the tractor frame 18', and in fact it rides directly on the tractor frame in the moving or lowered position of the mower frame, as shown in FIG. 11.

FIG. 13 shows the location of three mower reels 41', 42', and 43', all of which are articularly mounted on the mower frame 13'. The reels are shown in dot-dash lines in FIG. 13, and they are shown in dot-dash circles in FIG. 14. Further, the reels are shown to be supported between mower side plates 44' which are movably supported on the ground line designated 46' in FIG. 14. The support is by means of a forward roller 47' and a rearward roller 48', both of which extend across the width of the mowers and between the plates 44'. Mower supporting forks 49' are connected to the plates 44' by means of pins 51', or the like, so that the mowers may be secured to the mower or carrier frame 13'. The mower forks 49' are pivotally attached to the mower frame 13' through the upright shaft 52' which is connected to the fork 49'. A sleeve 53' depends from the mower frame front member 38' to rotatably receive the shaft 52' so that the mowers can of course pivot or rotate about the axis of the shaft 52' in steering the mowers in accordance with the steering of the entire unit. That is, if the entire unit is turned to the right, then the right hand ends of the mowers 41', 42', and 43', will move rearwardly while the left hand ends will move forwardly to turn about the turning center of the entire unit. This is a natural maneuver since the sleeves 53' are located forwardly on the mower units which are therefore in trailing and tracking position. Of course this mounting is true of the two front mowers 41' and 42', and a similar sleeve 54' and vertical pin 56' are provided for the rear mower 43', and the sleeve 54' is secured to the mower frame piece 39', as seen in FIG. 12, as well as in FIG. 13 and FIG. 14. It will be further understood that the shafts or pins 52' are attached to the affixed sleeves 53' in a suitable manner so that upon raising the mower frame 13', the shafts 52' and 54' will also be raised and thereby raise the mower forks 49' and the entire mowers.

The forks 49' include uprightly disposed side members 57' which have slots 58' for receiving the pins 51'. It will therefore be apparent that both ends of the mowers can move up and down within the limits of the slots 58' and thus adjust themselves to the contour of the ground being mowed. Another important feature of this arrangement is that the mower frame 13' is resting on the tractor frame 12', but the mower frame 13' is not placing its weight on the mower units themselves. That is, the mower units are resting directly on the ground but do not support any part of the framing described such as the mower frame 13' and the mower forks 49'.

Further, the mowers can move not only vertically in a lateral plane with respect to the direction of the unit, but they can move vertically with respect to the fore-and-aft plane. Thus the mower units may actually pivot about the axis of the pins or bolts 51', and such pivotal movement is restricted by an arm 59' affixed to the forks 49' and extending rearwardly to connect to the mower cross tube 61' through a bolt or pin 62'. The arms 59' have upright disposed slots 63' which slidably receive the pin 62' so that the latter can be affixed to the cross tube 61', which in turn is connected to the mower side plates 44', and the rear end of the mowers can move up and down within the limits of the slots 63'.

Other than having the mower frame 13' rest upon the tractor frame 12', the connection between the two frames is a hydraulic ram 64' consisting of a cylinder 66' and a rod 67'. The cylinder 66' is disposed in a sleeve 68' affixed between the tractor cross frame pieces 33', as shown in FIG. 12. Also, a cylinder 69' receives the upper end of the piston rod 67', and the cylinder 69' is affixed to a cross frame piece 71' extending and connected to the sides 36' and 37' of the mower frame 13'. Through this means, the mower frame retains its fore-and-aft position with respect to the tractor frame, and the mower frame 13' is raised and lowered between the FIG. 11 position and the FIG. 12 position. These are the mowing and transport positions respectively. FIGS. 11 and 12 also show a hood or cover 72' which includes the reservoir for the hydraulic system of which the ram 64' is a part. The hydraulic system also has three pumps 73' and one pump 74', all of which are powered by the prime mover 14' as indicated. Thus a drive pulley 76' is rotated by the engine 14', and a belt 77' extends to a pulley 78' which is connected to the three pumps 73' to drive the latter. Also, a belt 79' extends from the pulley 76' to the pulley 81' which is connected to the pump 74' to drive the latter. The three pumps 73' drive motors in the three mowers 41', 42', and 43', and the pump 74' drives the two motors in the traction wheels 16', and it also pressurizes the ram cylinder 66'. The ram cylinder 66' is secured in the mounting sleeve 68' by means of a pin 82' so that the cylinder can be slightly adjustable and pivotal therein to accommodate the mounting described for the connection between the two frames of the gang unit.

Of course suitable hydraulic lines or hoses extend between the pumps 73' and 74' and valves, such as three valves 83' for the pumps 73' and the reel motors 84', as indicated in FIGS. 11 and 16, in addition to FIG. 12.

FIG. 11 shows inlet and outlet hoses, 86' and 87' connected in pairs to the indicated reel motors 84' for the pressure and return lines with respect to the motors 84'. Thus, all of the mower reels are driven in unison as desired so that the same cutting is effected by each of the reels.

FIG. 16 schematically indicates the three reel pumps 73' with hose pressure lines 88', 89', and 91', leading respectively into the three reel valves 83'. Pressure lines 93', 94', and 96' are shown connected to the valves 83' with each leading into the dotted rectangles designating the respective reel motors 84'. A reservoir tank return is designated at 97', and return lines 98', 99', and 101', are shown connected from the motors 84' to the return tank 97'. Three return lines 102', 103', and 104' are shown connected to a header 106' and to the three valves 83'. These are available for return of fluid when the reels are not operating. Also, pump suction lines 108' and 109' are connected between the pump 73' and the tank outlet header designated 111'. Thus the hydraulic circuit for driving the three reel motors 84' is completed.

A common valve control arm 112' and rod 113' are shown in FIG. 12 to be connected through a control lever 114' and mounted on the handle 29'. The operator therefore has control over the reel valves 83' to run them all in unison as desired.

FIG. 17 shows the hydraulic system for the traction wheels 16' and the ram 64'. Here it will be noted that the pump is shown at 74', and has a pressure line or hose 116' leading to one side of the four-way traction valve, and this side is designated 117'. The traction valve has what may be designated two other sides 118' and 119', and they have hoses 121' and 122' respectively connected thereto and leading into a T 123' and a T 124'. One side of each of the T's 123' and 124' leads into the traction motor 126', on one side of the gang unit, and the other side of each of the T's 123' and 124' has hoses 127' and 128' respectively connected thereto for leading into the traction motor designated 129', which is the motor on the other side of the unit. With the double leads into each of the motors 126' and 129', the motors may be run either forward or reverse for forward and reverse movement of the tractor. With the valve set to eject fluid at 118', the motors 126' and 129' are run forward. With fluid outlet at 119', the motors are in reverse.

A line or hose 131' extends from a fourth or neutral side designated 132' of the traction valve to the side designated 136' of the ram valve. This brings the hydraulic fluid to the ram valve. A pressure hose 134' extends from a side 133', of the ram valve, to the ram cylinder 66', as indicated. The ram valve also has a return line hose 137' extending from the valve side 135' to a tank return designated 138'. The traction motors 126' and 129' also have a return bleed hose 139' connected thereto, and the hose 139' is connected to a hose 141' which extends to the tank return 138'. Finally, a hose 142' connects to a tank outlet 143' and to the pump 74' for supplying the pump with hydraulic fluid. The pumps 73' and 74' are synchronized by the arrangement and drive described so that the forward speed of the gang unit through the traction wheels 16' is synchronized with the speed of rotation of the mower reels, for the desired mowing action.

The tractor frame sections 34' carry forks 169' which extend above the mower forks 49' such that upon raising the mower frame 13', the tractor forks 169' engage the mower forks 49' to secure the latter in an oriented position for transport. This retains the mowers against swinging and getting out of alignment in transport so that a restricted width of passageway may be negotiated with the mower unit, and there will be no damage to the mowers since they will be held firmly by the forks 169'.

FIG. 12 shows upright members 171', which are fixed to the tractor frame 18', extending above the frames to support the reservoir 72' and to serve as a guide for the up and down movement of the mower frame 13'. Also, a piece 172' is attached to the tractor frame 18' at the rearward portion thereof and at each side thereof, and the piece 172' is angled as shown to guide the mower frame 13' when the latter is lowered onto the frame 18'. It will also of course be understood that the hoses described, such as the hoses 86' and 87', have sufficient length or slack so that the turning or steering of the mowers may be accomplished, and also the raising and lowering of the mowers and the pivoting in all directions may be accomplished. Also, the two hoses 86' and the two hoses 87' are represented by the two lines 94' and 96' and 98' and 99' lines.

The connection between the mower frame and the three mowers themselves, that is, the pins 51' and slots 58' on the forks 49', is a lost motion connection.

Also, the ram 64' is located at the center of gravity of the carrier frame 13', all the mowers and catchers and other attachments to the frame 13', so the entire mass is raised evenly.

Wheels 16' are oversized or of a substantial width to give only a minimum of ground pressure and turf impression. Wheels 17' are only balancing and steering wheels, as the wheels 16' are centrally located on the tractor unit.

What is claimed is:

1. In a gang lawn mowing machine of the type having a tractor and a plurality of lawn mowers movably attached to said tractor to pivot on said tractor for adjusting to the ground and for being raised off the ground, a prime mover included in said tractor and being operable at variable speeds, said tractor having ground wheels driven by said prime mover, first drive means operatively connected between said prime mover and said ground wheels and having a power input portion and a power take-off portion for transmitting power to said ground wheels to mobilize said machine at various mobilizing velocities, second drive means operatively connected between said prime mover and said mowers and having a power input portion and a power take-off portion for transmitting power to said mowers, said first and said second drive means being operatively connected together and powered by said prime mover in a fixed proportional drive speed for powering said mowers by said second drive means at speeds synchronized with the variable mobilizing velocities of said machine, control means operative on each of said drive means for selectively interrupting the transmission of power through each of said drive means, the improvement comprising power diverter means operatively connected between the two said drive means at an operative location to be connected intermediate both of the respective said power input portions and said power take-off portions thereof, and switch means operative on said power input portion of said second drive means for directing all the power from said second drive means through said power diverter means and to only said power take-off portion of first drive means for powering the latter and mobilizing said tractor to thereby obtain maximum speed of travel.

2. The subject matter of claim 1, wherein both said drive means are hydraulically operative and each of said power input portions includes a hydraulic pump powered by said prime mover and each of said power take-off portions includes a hydraulic motor respectively driven by said pumps, and said switch means includes hydraulic fluid lines and a hydraulic valve for control of the flow of hydraulic fluid between the respective said pumps and said motors.

3. The subject matter of claim 2, wherein said switch means is an additional hydraulic valve in said fluid lines and being hydraulically connected intermediate said hydraulic pump of said second drive means and said hydraulic valve of said first drive means for selectively controlling the flow of hydraulic fluid from said pumps to the first said hydraulic valve.

4. The subject matter of claim 2, including only one hydraulic ram connected intermediate said tractor and said mowers and with said ram being hydraulically connected to one of said pumps, and linkage connected intermediate said ram and all said mowers for raising and lowering said mowers on said tractor.

5. The subject matter of claim 4, wherein said mowers are arranged on said tractor with some of said mowers forwardly located on said tractor and the remainder of said mowers being rearwardly located on said tractor, and that portion of said linkage intermediate said hydraulic ram and said rearwardly located mower including a lost-motion connection for respectively raising and lowering said rearwardly located mower at a delayed time after the raising and lowering of each said forwardly located mower.

6. The subject matter of claim 5, including a plurality of said forwardly located mowers disposed in a row across said tractor, and said linkage intermediate said hydraulic ram and said forwardly located mowers being a full-motion linkage arranged to transmit all motion of said hydraulic ram to said forwardly located mowers for simultaneously raising and lowering of all said forwardly located mowers.

7. The subject matter of claim 5, wherein said lost-motion connection includes adjustment means for selective setting of the amount of lost motion desired.

8. The subject matter of claim 7, wherein said portion of said linkage includes a rotatable shaft and a plate affixed thereto for arcuate movement with the rotation of said shaft, said adjustment means is a threaded member adjustably positioned in the path of arcuate movement of said plate for establishing said amount of lost motion.

9. The subject matter of claim 8, including two of said threaded members on opposite sides of said plate in the path of arcuate movement of said plate for respectively establishing said amount of lost motion in the raising and the lowering of said mowers.

10. The subject matter of claim 1, wherein said second drive means is hydraulic and includes a hydraulic motor on each of said mowers, a spring connected intermediate said mowers and said tractor and arranged to counterbalance the weight of said motors on said mowers.

11. The subject matter of claim 4, including a cam and cam follower in said linkage for raising and lowering said mowers.

12. The subject matter of claim 4, wherein said linkage includes a member supported on said tractor and operatively connected with said mowers in the fully raised position of said mowers for holding said mowers up when the hydraulic pressure in said ram is released.

13. The subject matter of claim 12, wherein there is one said member for each of said mowers, and each said member includes a self-locking surface operatively engageable with the respective said mower for holding said mowers in the raised position when hydraulic pressure is released in said ram.

14. In a gang lawn mowing machine of the type having a tractor and a plurality of lawn mowers movably attached to said tractor to pivot on said tractor for adjusting to the ground and for being raised off the ground, a prime mover included in said tractor and being operable at variable speeds, said tractor having ground wheels driven by said prime mover, first drive means operatively connected between said prime mover and said ground wheels for transmitting power to said ground wheels to mobilize said machine at various mobilizing velocities, second drive means operatively connected between said prime mover and said mowers for transmitting power to said mowers, said first and said second drive means being operatively connected together to have both said drive means powered by said prime mover in a fixed proportional drive speed for powering said mowers by said second drive means at speeds synchronized with the variable mobilizing velocities of said machine, control means operative on each of said drive means for selectively interrupting the transmission of power through each of said drive means, mower attaching means connected intermediate each of said mowers and said tractor and including an arm vertically pivotally mounted on said tractor for vertically movably attaching each of said mowers to said tractor to raise said mowers off the ground and into a transport position and including a portion attaching together said arm and each of said mowers for vertical movement of said mowers with respect to said tractor when said mowers are operating on the ground, the improvement comprising said portion of each of said mower attaching means includes both a vertically disposed member and abutment surfaces, and with said mower having limit stops affixed to said mower and vertically spaced from said abutment surfaces and engageable with said abutment surfaces upon vertical movement of said mowers relative to said tractor for limited vertical movement of said mowers.

15. The subject matter of claim 14, wherein said second drive means is hydraulically operative and includes a hydraulic pump, and said second drive means includes a hydraulic motor on each of said lawn mowers and includes flexible hydraulic hoses extending to said motor to accommodate both raising and lowering of said mowers and said vertical movement of said mowers.

16. The subject matter of claim 15, wherein each said hydraulic motor is mounted on one side of each of said mowers, and a spring connected intermediate each of said mowers and said tractor and being arranged for counterbalancing the weight of said motors.

17. The subject matter of claim 15, including only one hydraulic ram connected intermediate said tractor and said mowers and with said ram being hydraulically connected to said pump and linkage connected intermediate said ram and all said mowers for raising and lowering said mowers on said tractor.

18. The subject matter of claim 17, wherein said mowers are arranged on said tractor with some of said mowers forwardly located on said tractor and the remainder of said mowers being rearwardly located on said tractor, and that portion of said linkage intermediate said hydraulic ram and said rearwardly located mower including a lost-motion connection for respectively raising and lowering said rearwardly located mower at a delayed time after the raising and lowering of each said forwardly located mower.

19. The subject matter of claim 18, wherein said lost-motion connection includes adjustment means for selective setting of the amount of lost motion desired.

20. In a gang lawn mowing machine of the type having a tractor and a plurality of lawn mowers movably attached to said tractor to pivot on said tractor for adjusting to the ground and for being raised off the ground, a prime mover included in said tractor and being operable at variable speeds, said tractor having ground wheels driven by said prime mover, first drive means operatively connected between said prime mover and said ground wheels for transmitting power to said ground wheels to mobilize said machine at various mobilizing velocities, second drive means operatively connected between said prime mover and said mowers for transmitting power to said mowers, lift means operatively connected between said tractor and said mowers for pivotally raising and lowering the latter, the improvement comprising a cam follower interconnected with each of said mowers, said lift means including a hydraulic system having a hydraulic cylinder and cam means and with said cam means existing in plural with each said cam means including a cam respectively disposed adjacent each of said mowers and with each said cam having a first surface engageable with each respective said cam follower for raising said mowers on said tractor when there is hydraulic pressure in said hydraulic cylinder, and each said cam having a second surface engageable with each respective said cam follower for upwardly supporting said mowers on said tractor when there is no hydraulic pressure in said hydraulic cylinder.

21. The subject matter of claim 20, wherein said lift means includes linkage connected between all said mowers, and there is only one said hydraulic cylinder for raising and lowering all said mowers.

22. The subject matter of claim 20, wherein said mowers are pivoted on said tractor by a pivotal member extending from said tractor to each of said mowers, each of said cam followers being mounted on the respective one of said pivot members, and each of said cams is vertically spaced from each respective said cam follower when said mowers are on the ground and said mowers are thereby free of said cam followers.

23. In a gang lawn mowing machine of the type having a tractor and a plurality of lawn mowers movably attached to said tractor to pivot on said tractor for adjusting to the ground and for being raised off the ground, some of said mowers being forwardly disposed on said tractor and other of said mowers being rearwardly disposed on said tractor, a prime mover included in said tractor, said tractor having ground wheels driven by said prime mover, drive means operatively connected between said prime mover and said ground wheels for transmitting power to said ground wheels to mobilize said machine, lift means intermediate said tractor and said mowers for pivotally raising and lowering the latter, the improvement comprising said lift means including connections to said mowers with a lost-motion connection to said rearward ones of said mowers for raising and lowering said rearward ones of said mowers at a time subsequent to the respective raising and lowering of said forward mowers such that all said mowers are raised and lowered on the same line along the ground when the machine is mobilized.

24. The subject matter of claim 23, wherein said lift means is connected to said prime mover to be operated in synchronization with the operation of said drive means.

25. The subject matter of claim 24, wherein said drive means and said lift means both include hydraulic mechanism for operation off said prime mover.

26. The subject matter of claim 23, wherein said lift means includes a hydraulic cylinder of which there is only one for raising and lowering all said mowers.

References Cited

UNITED STATES PATENTS

| | | | |
|---|---|---|---|
| 3,005,562 | 10/1961 | Shaffer | 60—52 X |
| 3,018,902 | 1/1962 | Minty | 60—52 X |
| 3,058,281 | 10/1962 | Lewis | 56—7 |
| 3,177,638 | 4/1965 | Johnson | 56—7 |
| 3,206,875 | 9/1965 | Cargile | 60—53 |
| 3,208,221 | 9/1965 | Schuetz | 60—53 X |
| 3,248,864 | 5/1966 | Barth | 56—26 |
| 3,410,063 | 11/1968 | Speiser | 56—7 |

ROBERT PESHOCK, Primary Examiner

J. A. OLIFF, Assistant Examiner